Fig. 20    Fig. 21A    Fig. 21B
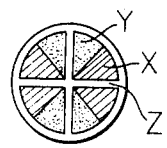    
Fig. 22    Fig. 23    Fig. 24
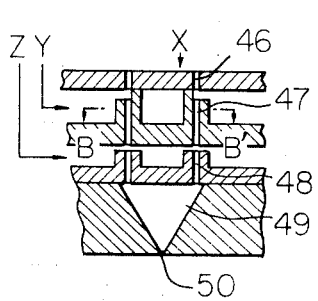  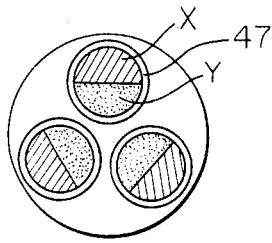  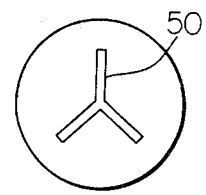
Fig. 25    Fig. 26
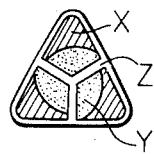  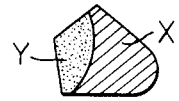

United States Patent Office 3,718,534
Patented Feb. 27, 1973

3,718,534
SPONTANEOUSLY CRIMPING SYNTHETIC COMPOSITE FILAMENT AND PROCESS OF MANUFACTURING THE SAME
Miyoshi Okamoto, Osaka, and Koji Watanabe, Otsu, Japan, assignors to Toray Industries, Inc., Tokyo, Japan
Filed Mar. 26, 1970, Ser. No. 22,803
Claims priority, application Japan, Mar. 26, 1969, 44/22,381
Int. Cl. B29f 3/10; D02g 3/00
U.S. Cl. 161—173
16 Claims

ABSTRACT OF THE DISCLOSURE

A spontaneously crimping synthetic composite filament having silk-like hand feel and sheen comprises at least two synthetic polymeric filamentary constituents which are different from each other and eccentrically incorporated into a filament body and has a fineness not exceeding 2.0 denier. The composite filament is manufactured using a process comprising (1) preparing a plurality of composite streams each of which is composed of at least two polymeric constituent streams eccentrically incorporated, (2) uniting the composite streams with a polymeric stream into a complex conjugate stream in which the uniting stream fills up spaces between the composite streams, (3) spinning the complex conjugate stream into a filament form, and (4) removing the uniting constituent in order to obtain the composite filaments. The invention includes a complex conjugate filament intermediately obtained in the above-stated process. The complex conjugate filament is composed of a plurality of composite filamentary segments and a uniting constituent which is removable.

The present invention relates to a spontaneously crimping synthetic filament and a process of manufacturing the same, and particularly, relates to a spontaneously crimping synthetic composite filament composed of at least two filamentary constituents eccentrically incorporated into a filament body having a very small fineness of 2 denier or less, and a process of manufacturing the same.

The term "composite filaments" as used herein, refers to filaments which consist of synthetic polymeric filamentary constituents eccentrically incorporated into a filament body.

The term "eccentric incorporation" as used herein, refers to two or more filamentary constituents incorporated in a "side-by-side" type form along the length of the filament or one or more filamentary constituents embedded in a filamentary constituent so as to form a "core-in-sheath" type form.

The term "spontaneously crimping" as used herein, refers to the capability of filaments to undergo spontaneous crimping immediately after heating, swelling, or stretching.

Generally, it is believed that filaments having a very small fineness have favorable silk-like sheen and hand feel. The manufacturing of the very small fineness synthetic filaments is very difficult due to difficulties of forming the orifice having a very small opening and of taking up the extruded fine filament at a very high velocity. That is, a lower limit of the fineness of the synthetic filaments is limited due to difficulty of practical processing. In order to overcome the difficulty, a convenient method is provided in which a composite filament composed of two filamentary constituents is prepared and then, one of the constituents is removed to form a fine filament composed of the remaining constituent.

However, the filaments obtained through the above-stated method have an undersirable low resiliency. Thus, the products from the filament have a high draping property, but the rigidity is undesirably low. Many improvements for solving this problem cannot be practiced due to complication of processing, requirement of excessive labor and technical difficulty of treating.

An object of the present invention is to provide a spontaneously crimping synthetic composite filament having a very small fineness and silk-like sheen and hand feel and a process for manufacturing the same.

Another object of the present invention is to provide a spontaneously crimping synthetic composite filament having a high resiliency and a high rigidity and a process of manufacturing the same.

Still another object of the present invention is to provide an intermediate complex conjugate filament for obtaining the composite filament of the present invention.

The composite filament of the present invention is composed of at least two filamentary constituents eccentrically incorporated into a filament body and has a fineness not exceeding 2.0 denier and a spontaneously crimping property. The filamentary constituents are different from each other and each essentially consists of at least one fiber forming synthetic polymer.

The composite filament has a fineness of 2.0 denier or less and may have a cross-sectional profile selected at will. In order to obtain a silk-like hand feel and sheen, it is preferable to have an irregular, particularly, trilobal cross-sectional profile and a fineness of 1.5 denier or less, preferably, 1.2 denier or less. Also, a fineness of 1.0 denier or less, preferably 0.8 denier or less, and a circular cross-sectional profile of the composite filament are effective for obtaining the silk-like properties. Particularly, it is effective for imparting the silk-like properties to the filament where at least one segment of the cross-sectional profile is shaped in a straight line or formed in a sharp-edged form. Preferably, the sharp-edge has an angle of at most 130°, more preferably, 95° or less. The presence of the sharp-edge is effective for imparting a high crispness to the composite filament. Also, the presence of the straight line segment is effective for imparting an elegant sheen to the composite filament.

The composite filament of the present invention may be composed of the filamentary constituents incorporated in a "core-in-sheath" type or "side-by-side" type form. In the case of "core-in-sheath," needless to say, the filamentary constituents must be incorporated eccentrically. If the filamentary constituents are concentrically incorporated into a filament body, the resultant composite filament cannot have a spontaneous crimping property.

In order to crimp the composite filament in a silk-like form, the filamentary constituents in the composite filament of the present invention have shrinkages or elongations different from each other. The shrinking or enlarging may be carried out through heating at a high temperature or swelling with a solvent.

The filamentary constituents in the composite filament of the present invention may consist of a polymeric material selected at will, preferably, may be selected from polyesters, for example, polyethylene terephthalate, polyamides, for example, nylon 6, nylon 66, and nylon 12, polyolefins, for example, polypropylene and polyethylene, and acrylic polymers, for example, polyacrylonitrile. The constituents may be the same polymers having different molecular weight, or containing different additions.

The composite filament of the present invention is converted to a crimped composite filament having a number of crimps of 2 crimps/30 mm. or more through a proper treatment such as heating, swelling or stretching.

The composite filament of the present invention is manufactured using a process which comprises the following steps: (1) at least two fiber-forming synthetic polymeric liquid constituent streams different from each other are eccentrically incorporated into a composite stream, and a plurality of the composite streams formed thus are located apart from the others, (2) the composite streams are united with fiber forming synthetic polymeric liquid constituent streams into a complex conjugate stream in a manner wherein the uniting stream fills up spaces between the composite streams, (3) the complex conjugate stream is extruded through a spinning orifice for spinning a complex conjugate filament, and the extruded filament is solidified, and (4) the uniting constituent in the resultant complex conjugate fiber is removed and thus, a composite filament is prepared.

The present invention also includes a complex conjugate filament intermediately obtained in the above-stated process. The complex conjugate filament is composed of a plurality of composite filamentary segments in each of which at least two synthetic polymeric filamentary constituents different from each other are eccentrically incorporated into a filament form, and a synthetic polymeric filamentary uniting constituent which unites the composite filamentary segments into a filament body by filling up spaces between the composite filamentary segments located apart from each other with the uniting constituent.

The features and advantages of the present invention will be described with reference to the accompanying drawings, in which:

FIG. 1 is a cross-section view of an embodiment of the spinning apparatus for carrying out the process of the present invention, FIG. 2 is a cross-section profile of a complex conjugate filament obtained through the apparatus of FIG. 1, FIG. 3 is a cross-section profile of a composite filament obtained from the complex conjugate filament of FIG. 2, FIG. 4 is a cross-section view of an embodiment of the spinning apparatus for carrying out the process of the present invention, FIG. 5 is a cross-section profile of a complex conjugate filament obtained through the apparatus of FIG. 4, FIG. 6 is a cross-section profile of a composite filament obtained from the complex conjugate filament of FIG. 5, FIG. 7 is a cross-section view of an embodiment of the spinning apparatus for carrying out the process of the present invention, FIG. 8 is a schematic view of a composite stream orifice of the apparatus of FIG. 7, FIG. 9 is a diagrammatic cross-section view of an arrangement of the composite stream orifices of FIG. 8, FIG. 10 is a cross-section profile of a complex conjugate filament obtained through the apparatus of FIGS. 7, 8 and 9, FIG. 11 is a cross-section profile of a composite filament obtained from the complex conjugate filament of FIG. 10, FIG. 12 is a cross-section view of an embodiment of the spinning apparatus for carrying out the process of the present invention, FIG. 13 is a cross-section profile of a complex conjugate filament obtained through the apparatus of FIG. 12, FIG. 14 is a cross-section profile of a composite filament obtained from the complex conjugate filament of FIG. 13, FIG. 15, is a cross-section view of an embodiment of the spinning apparatus for carrying out the process of the present invention, FIG. 16 is a cross-section profile of a complex conjugate filament obtained through the apparatus of FIG. 15, FIG. 17 is a cross-section profile of a composite filament obtained from the complex conjugate filament of FIG. 16, FIG. 18 is a cross-section view of an embodiment of the spinning apparatus for carrying out the process of the present invention, FIG. 19 is an arrangement of the constituent streams passing through the section along line A–A' indicated in FIG. 18, FIG. 20 is a cross-section profile of a complex conjugate filament obtained through the apparatus of FIGS. 18 and 19, FIGS. 21A and 21B are cross-section profiles of composite filaments obtained from the complex conjugate filament of FIG. 20, FIG. 22 is a cross-section view of an embodiment of the spinning apparatus for carrying out the process of the present invention, FIG. 23 is a diagrammatic cross-section view of an arrangement of the constituent streams passing through the section along line B–B' indicated in FIG. 22, FIG. 24 is a diagrammattic view of an orifice configuration for the complex conjugate stream in the apparatus of FIG. 22, FIG. 25 is a cross-section profile of a complex conjugate filament obtained through the apparatus of FIGS. 22, 23 and 24, FIG. 26 is a cross-section profile of a composite filament obtained from the complex conjugate filament of FIG. 25, FIG. 27 is a diagrammatic cross-section view of an arrangement of the composite stream orifices of FIG. 8, FIG. 28 is a cross-section profile of a complex conjugate filament obtained through the apparatus of FIGS. 7, 8 and 27, FIGS. 29A and 29B are cross-section profiles of composite filaments obtained from the complex conjugate filament of FIG. 28, FIG. 30 is a cross-section view of an embodiment of the spinning apparatus for carrying out the process of the present invention, FIG. 31 is a diagrammatic cross-section view of an arrangement of constituent streams passing through a section along section line D–D' indicated in FIG. 30, FIG. 32 is a passage configuration of the complex conjugate stream sectioned along line C–C' indicated in FIG. 30, FIG. 33 is a cross-section profile of a complex conjugate filament obtained through the apparatus of FIGS. 30, 31 and 32, FIGS. 34A and 34B are cross-section profiles of composite filaments obtained from the complex conjugate filament of FIG. 33, FIG. 35 is a diagrammatic view of an arrangement of constituent streams passing through a section along line D–D' indicated in FIG. 30, FIG. 36 is a cross-section profile of a complex conjugate filament obtained through the apparatus of FIGS. 30 and 35, FIG. 37 is a cross-section profile of a composite filament obtained from the complex conjugate filament of FIG. 36, FIG. 38 is a cross-section view of an arrangement of constituent streams passing through a section taken along section line D–D' indicated in FIG. 30, FIG. 39 is a cross-section profile of a complex conjugate filament obtained through the apparatus of FIGS. 30 and 38, FIG. 40 is a cross-section profile of composite filaments obtained from the complex conjugate filament of FIG. 39, FIG. 41 is a cross-section view of an arrangement of the constituent streams passing through a section along section line D–D' indicated in FIG. 30, FIG. 42 is a cross-section profile of a complex conjugate filament obtained through the apparatus of FIGS. 30 and 41, FIGS. 43A and 43B are cross-section profiles of composite filaments obtained from the complex conjugate filament of FIG. 42, FIG. 44 is a cross-section profile of a complex conjugate filament of the present invention, FIG. 45 is a cross-section profile of a complex conjugate filament of the present invention, FIG. 46 is a cross-section profile of a composite filament obtained from the complex conjugate filament of FIG. 45, FIG. 47 is a cross-section profile of a complex conjugate filament of the present invention, FIG. 48 is a cross-section profile of a composite filament obtained from the complex conjugate filament of FIG. 47, FIG. 49 is a cross-section profile of a complex conjugate filament of the present invention, FIG. 50 is a cross-section profile of a composite filament obtained from the complex conjugate filament of FIG. 49, FIG. 51 is a cross-section profile of a complex conjugate filament of the present invention, FIG. 52 is a cross-section profile of a composite filament obtained from the complex conjugate filament of FIG. 51, FIG. 53 is a cross-section profile of a complex conjugate filament of the present invention, FIG. 54 is a cross-section profile of a composite filament obtained from the complex conjugate filament of FIG. 53, FIG. 55 is a cross-section profile of silk.

It is well-known that raw silk is composed of a sericin constituent and a fibroin constituent. Referring to FIG. 55, fibroin constituent 1 is embedded in a sericin constituent 2. The raw silk is treated in a soap solution or alkalin solution in order to remove the sericin constituent 2. Through this treatment, a fibroin filament having an elegant sheen and a soft hand feeling is obtained. We found, through our study concerning silk, that silk has a crimping characteristic different from that of wool. Therefore, we proposed to obtain a synthetic filament having a silk-like sheen and hand feel, and a favorable crimping property. The crimping property of the silk is based upon winding up of the raw silk filament discharged by a silkworm on a cocoon along a continued 8-shape way. Further, this winding up of the raw silk filament causes an unsymmetrical arrangement of fibroin constituent in the sericin constituent. Therefore, the scoured silk filament has an 8-shaped crimping and high resiliency.

We utilized our observation on such a silk structure for the study of the silk-like synthetic filament.

It is considerable for manufacturing a silk-like filament that a two-componental composite filament can be obtained by removing one component from a three componental composite filament. However, it is very difficult to manufacture the three componental composite filament by the conventional process and thus, to obtain a uniform filament having a uniform composition and constitution and very small fineness, for example, 2 denier or less.

Therefore, such a silk-like synthetic filament must have a novel feature and be manufactured by a novel process.

In the process of the present invention the composite stream, composed of at least two constituent streams eccentrically incorporated, can be formed by a conventional manner. A plurality of composite streams are united by a uniting stream in a manner in which the uniting stream fills up spaces between the composite streams into a complex conjugate stream. The complex conjugated stream formed thus flows through a spinneret while decreasing its diameter and then is extruded through a spinning orifice. The extruded stream is solidified into a complex conjugate filament which is composed of a plurality of composite filamentary segments having a very small fineness and extending along the length of the complex conjugate filament and a uniting constituent.

Referring to FIG. 1, three polymeric liquid constituent streams X, Y and Z, different from each other, are fed from supply sources 3, 4 and 5 to a spinning pack 6. X, Y and Z constituent streams are filtered with filter beds 7, 8 and 9, respectively. X, Y and Z constituent streams filtered thus are fed to the spinneret 10. X constituent streams pass through orifices 11, and then are incorporated with Y constituent streams at incorporating portions 12. X and Y streams mutually incorporated pass through orifices 13 in a first composite streams in each of which, the X constituent stream is eccentrically embedded in the Y constituent stream, and then the first composite streams passed through the orifices 13 are each further incorporated with the Z constituent stream at incorporating portion 14.

The further incorporated streams each composed of X, Y and Z constituent streams pass through orifices 15 in second composite streams in each of which the first composite stream is embedded in the Z constituent stream. Thus second composite streams are united in a chamber 16 into a complex conjugate stream in which four first composite streams are embedded in the Z constituent symmetrically with respect to a cross-sectional center of the complex conjugate stream. The chamber 16 has a funnel shape. Thus, the complex conjugate stream passes through the chamber 16 while decreasing its diameter, and then extruded through an orifice 17. The extruded complex conjugate stream is solidified by cooling or coagulating into a complex conjugate filament. The resultant complex conjugate filament has a cross-sectional profile indicated in FIG. 2 in which X and Z constituents form a composite segment and in which the X constituent is eccentrically embedded in the Y constituent. The composite segments are symmetrically embedded in the Z uniting constituent, and the X and Y constituents are also symmetrically located with respect to the cross-sectional center.

Through removal of the Z uniting constituent by a proper manner, a bundle of four fine composite filaments is obtained. The fine composite filament has a trilobal cross-sectional profile indicated in FIG. 3. The profile comprises an arc line 18 and two substantially straight lines 19 and 20.

Constituents in the composite filament of the present invention essentially consist of fiber forming polymers different from each other, for example, different kinds of polymers, different molecular weight polymers, copolymers containing different copolymerization components. This difference between the polymeric constituents causes a difference of shrinkage of heating or swelling. Such polymers may be selected from fiber forming polymers, for example, polyesters such as polyethylene terephthalate, polytetramethylene terephthalate, polypropylene terephthalate, polybutylene terephthalate, polyoxyethylene benzoate, and other polyethylene terephthalate type co-polyesters, polyamides such as nylon 6, nylon 66, nylon 9, nylon 11, nylon 12, nylon 610, block polytheramides, these copolymers and these mixtures, crystalline polyolefins such as polyethylene, polypropylene, these copolymers and these mixtures, acrylic polymers such as polyacrylonitrile and acrylonitrile copolymers. These polymeric constituents may further contain other components such as titanium dioxide, antioxidants, surface active agents and other additions such as polyethylene glycol, polypropylene glycol, these copolymers and these mixtures.

The combination of the constituent polymers of the composite filament may be selected from the combinations of two polyethylene terephthalates having different intrinsic viscosity, or example, 0.8 and 0.6, nylon 6 and nylon 66, nylon 6 and nylon 6-nylon 66 copolyamide, polyethylene terephthalate and polytetramethylene terephthalate, polyethylene, terephthalate and polyethylene terephthalate - polytetramethylene terephthalate blend, PACM-12 polymers having different contents of cis-type polymer and trans-type polymer, polyethylene terephthalate and a blend of 70 to 95% by weight of polyethylene terephthalate and 5 to 30% by weight of nylon 6 or nylon 66, polyethylene terephthalate type copolyesters containing sodium sulfoisophthalate and having different molecular weights, PACM–12 and PACM–12–PACM–9 copolymer, polypropylene and polyethylene-polypropylene copolymer or a blend, and polyacrylonitrile and polyacrylonitrile copolymer.

The uniting constituent in the complex conjugate filament of the present invention is easily removable. Thus, the Z uniting constituent must consist of an easily removable polymeric material, for example, polymeric materials capable of being easily dissolved off with a solvent, such as polystyrene, styrene-acrylonitrile copolymers, styrene-methyl methacrylate copolymer, styrene-acrylonitrile-methyl methacrylate copolymer and these mixtures, and polymeric material capable of being easily decomposed with a reagent such as alkali or acid, such as polyethylene sebacate, polyethylene terephthalate type copolyesters containing polyethylene glycol, polypropylene glycol or these copolymers, as a glycol component, and these mixtures.

The solvents for dissolving off the styrene containing polymers may be selected from trichloroethylene, tetrachloroethylene, benzene, toluene, xylene, tetrachloromethane, dimethyl acetamide, dimethyl sulfoxide and dimethyl formamide.

The reagents for removing the polyester type uniting constituents may be selected from sodium hydroxide, potassium hydroxide and other alkali-metal hydroxides. Further, Z constituents essentially composed of polyamide such as nylon 6 and nylon 66 are removed by treating in formic acid, a methanol solution of calcium chloride, or an aqueous solution of hydrogen chloride.

In the case of a "core-in-sheath" type complex conjugate filament as indicated in FIG. 2, the sheath constituent must have a removing velocity such as dissolving velocity and decomposing velocity lower than that of the uniting constituent with respect to reagents effective for removing the uniting constituent. Preferably, the sheath constituent is not substantially removed in the reagents. The core-constituent and the uniting constituent may consist of the same polymeric material. Generally, in the uniting constituent removing processes, the core-constituent is not removed owing to the covering by the sheath constituent.

In the case of a "side-by-side" type complex conjugate filament as indicated in FIG. 5, each of the constituents in the composite segments must have a removing velocity lower than that of the uniting constituent with respect to reagents effective for removing the uniting constituent. It is preferable that the composite segments are not substantially decomposed in the reagents.

If X and Y constituents in the composite filament have different shrinkages for heating, the composite the filament can ber cirmped by heating. Also, if X and Y constituents have different shrinkages for swelling in a solvent, the composite filament can be crimped by treating in the solvent. The crimping processes for the composite filaments according to the present invention will be concretely described in examples hereinafter.

In order to carry out the process of the present invention at a favorable condition, it is important that the composite streams, except one positioned at a cross-sectional center of the complex conjugate stream, are located symmetrically with respect to the center. This symmetrical location is valuable for preventing the complex conjugate stream extruded through the spinning orifice from bending just beside the orifice. If an unsymmetrical location of the composite streams is provided, the extruded stream bends just beside the orifice and adheres with an outside portion of the orifice. The bending and adhering cause breakage of the extruded stream. Further, the symmetrical location is valuable for preventing the complex conjugate filament from bending prior to weaving and knitting. If the unsymmetrical location is provided, the resultant complex conjugate filament has a tendency to bend during treatments, for example, drawing, oiling and thermosetting. This bending causes difficulties for handling the complex conjugate filament yarns during weaving or knitting.

It is very important that the present invention can be provided with highly crimping composite filaments and slightly crimping composite filaments by selection of the combination of the constituents. The composite filaments having various crimping properties will be concretely disclosed in examples hereinafter.

Further, it is important that the complex conjugate filament cannot be crimped owing to the presence of the uniting constituent. Therefore, the complex conjugate filament is processed without difficulty due to the crimping.

When the Z constituent in the complex conjugate filaments formed in a fabric is removed, spaces remain, which which were occupied by the Z constituent and are valuable for effecting the crimping of the composite filaments resulting from the complex conjugate filaments. Although the removal of the Z constituent results in a fabric having a rigidity and a resiliency lower than those of the original fabric through this crimping operation, the fabric is imparted a rigidity, a resiliency and a drapability higher than those of the original fabric, because the crimpings fill up the spaces and the very fine composite filaments in the fabric have a favorable freedom from each other.

Referring to FIG. 4, the X constituent streams passed through orifices 21 are incorporated with the Y constituent streams at incorporating portions 22 into first composite streams. The incorporated X and Y streams pass through orifices 23 while forming "side-by-side" type first composite streams. The first composite streams are further incorporated with the Z constituent streams at incorporating portions 24. Four further incorporated streams pass through orifices 25 while forming "core-in-sheath" type second composite streams in which four first composite streams are symmetrically embedded in the Z streams.

The second composite streams are united in a funnel shaped chamber 26 into a complex conjugate stream and the complex conjugate stream is extruded through a spinning orifice 27 into a complex conjugate filament. The resultant complex conjugate filament has a cross-sectional profile indicated in FIG. 5 and is converted to the composite filaments indicated in FIG. 6 by removing the Z uniting constituent.

Referring to FIGS. 7, 8 and 9, the X constituent streams passed through orifices 28 are incorporated with the Y constituent streams fed through passages 29 disposed in orifices 30 as indicated in FIGS. 7 and 8, into "side-by-side" type streams indicated in FIG. 9. The boundary lines 31 between X and Y constituent streams in the orifices 30 have directions as indicated in FIG. 9. Therefore, in the resultant complex conjugate filament indicated in FIG. 10, each of the X and Y constituents in the composite segment is symmetrically located with respect to the cross-sectional center. Through the removing of the Z uniting constituent, the complex conjugate filament indicated in FIG. 11 in which X and Y filamentary constituents are mutually adherent side by side.

Referring to FIG. 12, X constituent streams pass through orifices 32 and are eccentrically incorporated with Y constituent streams in orifices 33 into a "core-in-sheath" type form. The eccentrical composite streams are further incorporated with the Z constituent stream at an incorporating portions 34, and the three constituents composite streams pass through orifices 35 while forming "core-in-sheath" type streams. The passed streams are united in a funnel chamber 36 into a complex conjugate stream in which six eccentrically composite streams are symmetrically embedded in the Z constituent stream. The resultant complex conjugate filament has a cross-sectional profile indicated in FIG. 13. Through the removing of the Z uniting constituent, a complex filament having a cross-sectional profile illustrated in FIG. 14 is obtained.

Referring to FIG. 15, the X constituent streams passed through orifices 37 are incorporated with Y constituent streams while passing through orifices 38 in "side-by-side" type composite streams. The "side-by-side" type streams are further incorporated with the Z constituent stream while passing through orifices 39 in "core-in-sheath" streams in which the composite streams of X and Y constituent streams are symmetrically embedded in the Z constituent stream. The "core-in-sheath" type streams are united in a funnel chamber 40 into a comple conjugate stream, and then the complex conjugate stream is extruded through an orifice 41.

The resultant complex conjugate filament has a cross-sectional profile as illustrated in FIG. 16. The complex conjugate filament is converted to the composite filaments having a cross-sectional profile as illustrated in FIG. 17.

Referring to FIGS. 18 and 19, X constituent streams pass through orifices 42 and are incorporated with Y constituent streams in a "side-by-side" type composite streams while passing through orifices 43. The composite streams are further incorporated with Z constituent streams into a "core-in-sheath" type streams in each of which the "side-by-side" type composite stream is embedded in Z-uniting constituent stream while passing through orifices 44.

The "core-in-sheath" type streams are united with the Z constituent stream supplied through passage 45. FIG. 19 shows a cross-section of the spinneret of FIG. 18 along line A–A'. The Z constituent stream supplied through the cross-shaped passage 45 as indicated in FIG. 19 unites the "core-in-sheath" type streams into a complex conjugate stream.

The resultant complex conjugated filament has a cross-sectional profile as illustrated in FIG. 20, in which four composite segments composed of X and Y constituents mutually adherent side by side are symmetrically embedded in the Z uniting constituent.

The complex conjugate filament is divided into four composite filaments by removing the Z uniting constituent. The resultant composite filaments have a cross-sectional profile indicated in FIG. 21A or 21B.

Referring to FIGS. 22, 23 and 24, X constituent streams pass through orifices 46 and are incorporated with Y constituent streams while passing through orifice 4 in "side-by-side" type composite streams. The "side-by-side" type composite streams are arranged in a form indicated in FIG. 23. The composite streams are further incorporated with the Z constituent stream while passing through orifices 48 into "core-in-sheath" type stream. The "core-in-sheath" type streams are united in a funnel chamber 49 into a complex conjugate stream and then extruded through a Y-shaped spinning orifice 50 as indicated in FIG. 24. The resultant complex conjugate filament has a trilobal cross-sectional profile shown in FIG. 25. The complex conjugate filament is divided into three complex filaments having an irregular square cross-sectional profile as indicated in FIG. 26.

A variation of the spinneret indicated in FIGS. 7, 8 and 9 is illustrated in FIG. 27. Referring to FIG. 27, the arrangement of the passages 29 of the orifices 30 is different from that of FIG. 9. The resultant complex conjugate filament has a cross-sectional profile illustrated in FIG. 28. This complex conjugate filament imparts two kinds of composite filaments having cross-sectional profiles illustrated in FIGS. 29A and 29B.

Referring to FIGS. 30, 31 and 32, X constituent streams pass through orifices 51a and are incorporated with Y constituent streams entered through openings 51b into "side-by-side" composite streams while passing through orifice 52. The Z constituent stream is supplied through a cross-shaped passage 53 into a uniting chamber 54. FIG. 31 shows an arrangement of X, Y and Z constituent streams at a cross-section which is sectioned along a line D–D' indicated in FIG. 30. FIG. 32 shows a cross-section of the uniting chamber 54 along a line C–C'.

The composite streams pass through the orifices 52 and are united with the Z constituent stream passed through the passage 53 in the uniting chamber 54 into a complex conjugate stream.

The resultant complex conjugate filament has a cross-sectional profile as indicated in FIG. 33 in which four quarter circular composite segments are adhered by a cross-shaped Z uniting constituent.

The complex conjugate filament is divided into two kinds of composite filaments having cross-sectional profiles indicated in FIGS. 34A and 34B by removing the Z uniting constituent. These cross-sectional profiles have two straight line segments 55 and 56 and three sharp edges 57, 58 and 59.

A variation of the arrangement of the X, Y and Z constitutent stream in the spinneret indicated in FIG. 30 is shown in FIG. 35. This arrangement results in a complex conjugate filament having a cross-sectional profile indicated in FIG. 36. The complex conjugate filament is divided into four composite filaments having a cross-sectonal profile indicated in FIG. 37.

FIG. 38 shows another variation of the arrangement of X, Y and Z constituent streams in the spinneret of FIG. 30. This arrangement results in a complex conjugate filament having a cross-sectional profile indicated in FIG. 39. The complex conjugate filament is divided into four composite filaments having a cross-sectional profile indicated in FIG. 40 by removing the Z uniting constituent.

FIG. 41 shows still another variation of the arrangement of X, Y and Z constituent streams in the spinneret of FIG. 30. This arrangement results in a complex conjugate filament having a cross-sectional profile indicated in FIG. 42. This complex conjugate filament is divided into two kinds of composite filaments having cross-sectional profiles indicated in FIGS. 43A and 43B by removing the Z uniting constituent.

A complex conjugate filament having a cross-sectional profile as indicated in FIG. 44 is prepared by using a spinneret similar to that of FIG. 4. Four composite filaments prepared from the complex conjugate filament have "side-by-side" type cross-sectional profiles different from each other.

Figure 47:
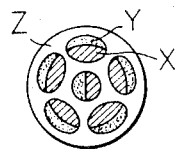

In FIG. 47, the complex conjugate filament contains six composite filamentary segments in which one segment is located at a cross-sectional center and other segments are located around the center segment symmetrically with respect to the center. This center segment has no influence in bending the extruded complex conjugate stream, in practice.

Figure 49:
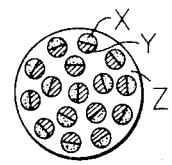

In FIG. 49, the complex conjugate filament contains 16 composite filamentary segments. Therefore, the complex conjugate filament provides very fine composite filaments.

Figure 53:
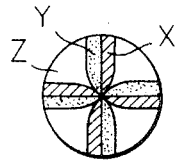
Figure 54:
Figure 55:
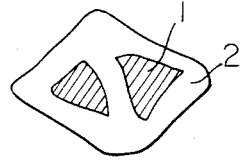

In FIG. 53 the complex conjugate filament contains four leaf-shaped composite filamentary segments which point-contact at top points thereof with each other. This complex conjugate filament is divided into four leaf-shaped composite filaments having a cross-sectional profile indicated in FIG. 54 by removing the Z uniting constituent.

The examples which follow are given for the purpose of illustrating the present invention.

EXAMPLE 1

Figure 2:
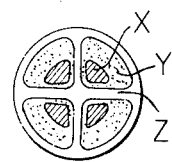

A complex conjugate filament having a cross-sectional profile indicated in FIG. 2 was prepared from the following constituents X, Y and Z. X constituent consisted of a polyethylene terephthalate type copolyester containing 49% by mole of isophthalic acid as an acid component and having an intrinsic viscosity of 0.85 (determined in O-chlorophenol at a temperature of 25° C.); and 0.5% of titanium dioxide powder based on the weight of the copolyester Y constituent consisted of polyethylene terephthalate having an intrinsic viscosity of 0.75; and 0.5% of titanium dioxide powder based on the weight of the polyester. Z constituent consisted of polystyrene and 1% polyethylene glycol having a molecular weight of approximately 20,000 based on the weight of the polystyrene.

Figure 1:
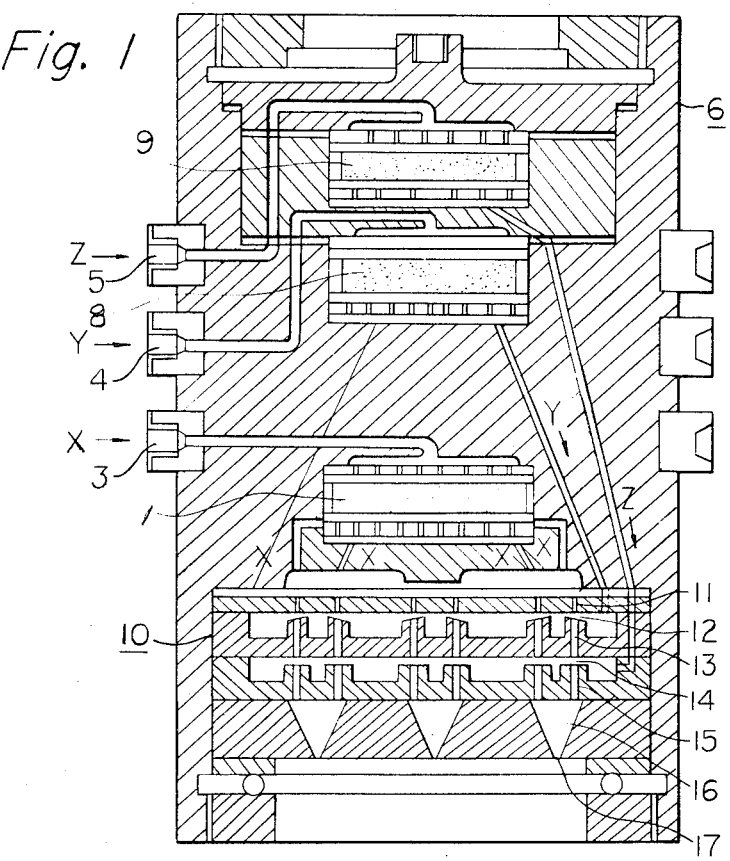

The X, Y and Z polymeric constituents were spun through a spinning apparatus indicated in FIG. 1 into a complex conjugate filament at a temperature of 285° C. The spinning was carried out at a favorable condition.

In the resultant complex conjugate filament, a ratio of contents of X, Y and Z constituents was 20:50:30. The spun filaments were passed through a spinning chimney conditioned at 30° C. and taken up at a velocity of 1,000 m./min. The obtained undrawn filaments were drawn at a draw ratio of 2.6 at a temperature of 90° C. The drawing was carried out at a favorable condition. Each resultant individual filament had a fineness of 5.2 denier and a cross-sectional profile as indicated in FIG. 2.

The resultant complex conjugate filament was immersed in tetrachloromethane in order to dissolve the Z constituent therein. A "core-in-sheath" type composite filament having a modified triangular cross-sectional profile indicated in FIG. 3 in which the X constituent was eccentrically embedded in the Y constituent was obtained. The composite filament obtained had a fineness of 0.91 denier. Through a thermotreatment, in water at 100° C., the composite filament was crimped at 25 to 30 crimps/30 mm. and had a tenacity of 3.1 g./d.

Also, a filament yarn consisting of 15 complex conjugate filaments and having a finess of 78 denier was formed into a plain weave fabric in which densities of warp and weft were 43 and 25 yarns/cm., respectively. The plain weave fabric was treated 5 times with tetrachloromethane in order to remove the Z constituent, dried at a temperature of 100° C. and then treated with boiling water.

The treated fabric had a creped appearance, a silk-like sheen and crispness and a favorable draping property. The treated fabric was treated in an aqueous solution containing 4% by weight of sodium hydroxide for 5 minutes, and then dried. The resultant fabric had a silk-like draping property, sheen and crispness and a high resiliency more than those of the tetrachloromethane-treated fabric.

For comparison, the X constituent and Y constituent were extruded through the conventional "core-in-sheath" type spinneret provided with an orifice having an isosceles triangular cross-sectional profile and the extruded filament were taken up at a velocity of 800 m./min. for trying the preparation of the composite filament having the same composition appearance and finess as those of the composite filament of the present example. However, the extrusion was carried out at an unstable condition due to bending of the extruded filament at just beside the orifice, and frequent dripping of the melts and the obtained filaments had a circular cross-section different from that of the composite filament of the present example which had a trilobal cross-section.

Further, for comparison, the above-mentioned comparison spinning was repeated except that the spinning orifice had a Y-shaped cross-sectional profile. However, the obtained composite filament consisting of X and Y constituents had a substantially circular cross-sectional profile and the extrusion was very unstable due to bending of the extruded filament.

Namely, the preparation of the composite filament having a very small fineness, for example, smaller than 2 denier through the conventional process is impossible in view of practical procedure, only the process of the present invention is effective for the preparation of such very fine composite filaments.

EXAMPLE 2

Figure 4:
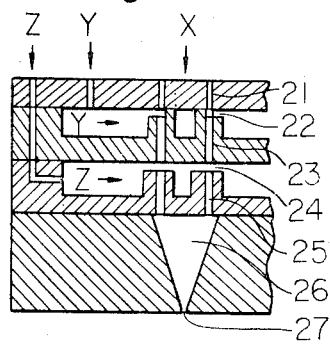
Figure 5:
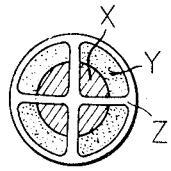
Figure 6:
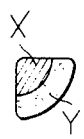

A complex conjugate filament having a cross-sectional profile as indicated in FIG. 5 was prepared from the same X, Y and Z constituents as indicated in Example 1 by using a spinning apparatus indicated in FIG. 4 in the similar manner as indicated in Example 1, except that the content ratio of the X, Y and Z constituents in the complex conjugate filament was 30:40:30. The spinning process was carried out at a favorable condition. The resultant complex conjugate filament was treated with O-tetrachloromethane, whereby a "side-by-side" type composite filament having a fineness of approximately 0.90 and a trilobal cross-sectional profile indicated in FIG. 6 in which the X constituent was incorporated with the Y constituent in a "side-by-side" form. The resultant composite filament was treated in boiling water, whereby the crimped composite filament had a crimping number of 30 to 35 crimps/ 30 mm. and a tenacity of 3.0 g./d.

Also, a filament yarns prepared from the complex conjugate filaments in the same manner as indicated in Example 1 could be formed into a crepe fabric as having the similar properties as those of the crepe fabric of Example 1.

For comparison, the composite spinning procedure of the X and Y constituents was carried out by using the conventional "side-by-side" type spinneret provided with an orifice having an isosceles triangular cross-section and by taking up the spun filament at a velocity of 1,000 m./min. for trying the preparation of the composite filament having the same composition, appearance and fineness as those of the composite filament of the present example.

However, the obtained composite filament had a circular cross-sectional profile different from that of the composite filament having a modified triangular cross-section profile, of the present example, and the extruding process was very unstable due to bending of the extruded filamentary melt.

EXAMPLE 3

Figure 7:
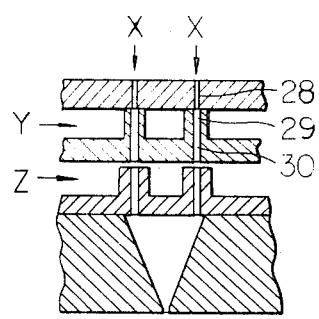
Figure 8:
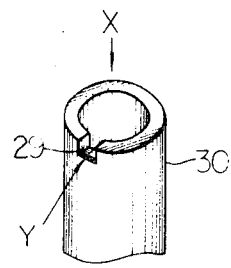
Figure 9:
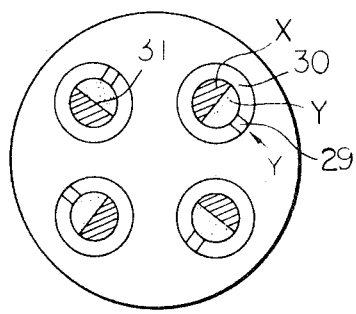
Figure 10:
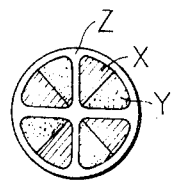

A complex conjugate filament having a cross-section as indicated in FIG. 10 was prepared from the same X, Y and Z constituents as indicated in Example 1 by using a spinning apparatus indicated in FIGS. 7, 8 and 9, in the similar manner as indicated in Example 1, except that the content ratio of the X, Y and Z constituents in the complex conjugate filament was 33:37:30. The spinning process was carried out at a favorable condition. Through a treatment by tetrachloromethane, a "side-by-side" type composite filament having a fineness of approximately 0.90 denier and a tenacity of 2.8 g./d. was obtained. The filament had a trilobal cross-sectional profile indicated in FIG. 11 in which the X constituent was incorporated with the Y constituent in a "side-by-side" form.

After treatment with boiling water, the composite filament had a crimping number of 35 to 40 crimps/25 mm.

Also, a filament yarn prepared from the complex conjugate filaments of the present example in the same manner as indicated in Example 1 could be formed into a crepe fabric having the similar properties as those of the crepe fabric of Example 1.

We found that the crepe fabric prepared from the complex conjugate filament yarns of the present example by weaving, removing the Z constituent with tetrachloromethane, treatment with boiling water and drying, successively, had a desirable silk-like hand feeling and a high resiliency superior to those of the crepe fabric prepared from the composite filament yarns, which was prepared from the complex conjugate filaments through the removing of the Z constituent by treatment with tetrachloromethane, weaving, treating with boiling water, and drying, successively.

This is owing to a fact that the former process is effective for forming spaces sufficient for crimping the composite filaments in the fabric more than the latter process.

For comparison, the composite spinning procedure of X and Y constituents was carried out by using the conventional "side-by-side" type spinneret provided with an orifice having a Y-shaped cross-sectional profile and by taking up the spun filament at a velocity of 15,000/min. for trying the preparation of the composite filament having the same composition, appearance and fineness (approximately 0.9 denier) as those of the composite filament of the present example. However, the spinning process was very unstable due to bending of the extruded melt and the resultant filament had a substantially circular cross-sectional profile different from the proposed triangular profile.

EXAMPLE 4

Figure 12:
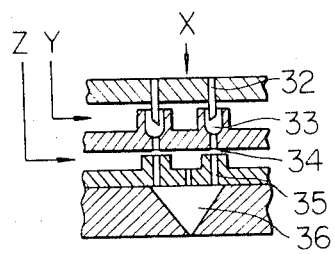
Figure 13:
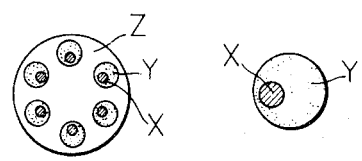
Figure 14:
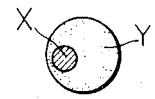

A complex conjugate filament having a cross-sectional profile indicated in FIG. 13 was prepared from the X, Y and Z constituents. The X constituent consisted of polyethylene terephthalate having an instrinsic viscosity of 0.9 which was prepared through the first conventional melt polymerization at a high temperature and a second vacuum solid-phase polymerization at a temperature from 230° C. to 240° C. in chip-form, and 0.5% of titanium dioxide powder based on the weight of polyethylene terephthalate. The Y-constituent consisted of polyethylene terephthalate having an intrinsic viscosity of 0.5 and 0.5% of titanium dioxide powder based on the weight of the polyethylene terephthalate. The Z constituent consisted of polystyrene and 50% polyethylene glycol having a molecular weight of approximately 20,000 based on the weight of polystyrene. Those components were spun at a content ratio of 13:32:55 at a temperature of 290° C. be using a spinneret indicated in FIG. 12, and taken up at a velocity of 1200 m./min. The spinning process was carried out at a favorable condition, and the desired cross-sectional profile of the complex conjugate filament was obtained. The spun filament was drawn at a drawing ratio of 2.55. A complex conjugate filament having a fineness of 2.8 denier resulted. The resultant complex conjugate filament was treated with tetrachloroethylene for dissolving off the Z constituent. A bundle consisting of 6 composite filaments each having a tenacity of 3.7 g./d., a fineness of 0.21 denier and a cross-sectional profile indicated in FIG. 14 was obtained.

The solvent-treated composite filament was thermo-treated in an air medium at a temperature of 140° C., whereby crimps of 30 crimps/30 mm. were formed on the composite filament.

Also, filament yarns as warp yarns were prepared from 78 complex conjugate filaments of the present example and textured filament yarns as weft yarns were prepared from 78 polyethylene terephthalate filaments each having a fineness of 2.8 denier and triangular cross-sectional profile by twisting at 3,550 turns/meter at a velocity of 210,-000 r.p.m. and then returning it. A fabric having a hard hand feeling was prepared from the above-mentioned warp and weft yarns. The fabric was treated with tetrachloromethane in order to dissolve off the Z constituent. After drying under an ambient condition, the obtained fabric was very soft but had an undesirable low resiliency.

The solvent-treated fabric was treated in boiling water. The resultant fabric had a preferable resiliency and a rigidity and silk-like hand feeling and sheen. The fabric was further treated in a solution containing 3% by weight of sodium hydroxide at a temperature of 98° C. for 15 minutes. The treated fabric had a silk-like hand feeling and sheen superior to those of the boiled off fabric.

In view of the cross-sections of the solvent-treated fabric and the boiled off fabric. The boiled off fabric had an average distance between the composite filaments larger than that of the solvent-treated fabric. For comparison, the conventional spinning procedure for preparation of the composite filament similar to the composite filament of the present example was tried by using the same X and Y constituents as those of the present example. In this attempt the spinning failed due to dripping of the melt.

EXAMPLE 5

Figure 15:
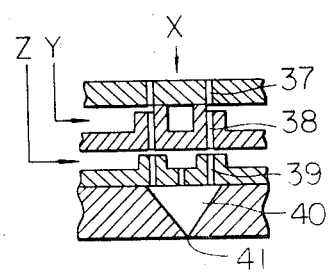
Figure 16:
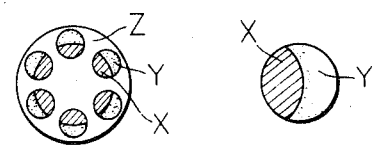
Figure 17:
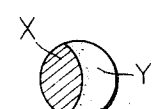

The spinning procedure as indicated in Example 4 was repeated except that the content ratio of the X, Y and Z constituents was 22.5:22.5:55, the cross-section had the profile as indicated in FIG. 16 and the spinneret used was one as indicated in FIG. 15. Spinning was carried out without difficulty and the resultant complex conjugate filament had a fineness of 2.8 denier. After the complex conjugate filament was treated with tetrachloromethane in order to remove the Z constituent, each of the resultant composite filaments had a fineness of 0.21 denier, a tenacity of 3.9 g./d. and a cross-sectional profile indicated in FIG. 17.

The resultant complex conjugate filament was knitted into a tubular knitted fabric. The fabric had a hard hand feel like that of the conventional filament knittings. After the knitted fabric was treated with tetrachloromethane in order to remove the Z constituent, the hand feel of the fabric was altered to a very soft but had a low resiliency. The solvent-treated fabric was treated in boiling water. The resultant fabric had a preferable bulkiness and hand feel due to formation of crimped composite filaments having a number of crimps of at least 30 crimps/30 mm. in the fabric. Furthermore, the resultant fabric had an excellent stretch back property, that is, elasticity.

For comparison, the composite spinning procedure of the X and Y constituents was carried out by using the conventional "side-by-side" type spinneret in order to prepare the composite filament similar to that of the present example. However, the spinning failed due to dripping of the extruded melt.

EXAMPLE 6

Figure 18:
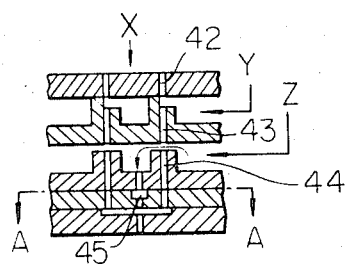
Figure 19:
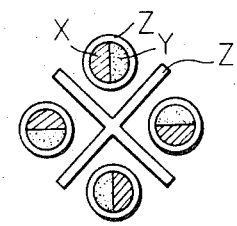

A complex conjugate filament having a cross-sectional profile indicated in FIG. 20 was prepared by using a spinneret as indicated in FIGS. 18 and 19 from the same X and Y constituents as indicated in Example 4 and Z constituent consisting of an acrylic copolymer containing 72 parts by weight of methyl methacrylate, 24 parts by weight of styrene and 4 parts by weight of acrylonitrile, at a temperature of 278° C. The content ratio of the X, Y and Z constituents was 35:35:30. The spun filament was taken up at a velocity of 1,500 m./min. and then drawn at a draw ratio of 2.50 at a temperature 130° C. The resultant complex conjugate filament had a fineness of 2.5 denier and a bright sheen. After removing the Z constituent by using tetrachloromethane, the resultant composite filament had a tenacity of 3.4 g./d., a fineness of 0.44 denier and a cross-sectional profile indicated in FIGS. 21A or 21B. The composite filament was altered to a highly crimped filament having a number of crimps of at least 40 crimps/30 mm.

The same spinning procedure was repeated except that the fineness of the resultant complex conjugate filament was 7.5 denier and the fineness of the composite filament after removing the Z constituent with tetrachloromethane was 1.3 denier. The resultant composite filament was a spontaneously crimping filament having a quartered circle-shaped cross-sectiontal profile having sharp edges.

A twill fabric was prepared from the composite filament and then treated in boiling water. An elegant fabric having a preferable resiliency and silk-like crispness was obtained.

The treated fabric was further treated with a hot aqueous solution containing 3% by weight of sodium hydroxide for 30 minutes. The resultant fabric had an elegant silk-like sheen superior to that of the boiled off fabric, a favorable softness and draping property and an excellent resiliency from deformation.

For comparison, the spinning procedure from the X and Y constituent were carried out using the conventional "side-by-side" type spinneret for preparing the composite filament having the cross-sectional profile similar to that of the present example. However, the extrusion failed because the melt extruded through the orifice expanded due to Baras effect and bent so as to adhere to the outside part of the orifice. The adhered polymeric melts dripped. Particularly, when the polymeric melts were extruded for preparing the composite filament of 0.44 denier fineness, the spinning could not be carried out due to the dripping of the extruded melts.

EXAMPLE 7

A complex conjugate filament having a cross-sectional profile indicated in FIG. 25 was prepared from X, Y and Z constituents stated below. X component consisted of polyethylene terephthalate having an intrinsic viscosity of 0.9 which was prepared through the first conventional melt polymerization at a high temperature and then the second solid phase polymerization in vacuum at a temperature from 230 to 240° C. in chip form. Y constituent consisted polyethylene terephthalate having an intrinsic viscosity of 0.5 which was prepared from a polymerization system containing 1% by mol boric acid. Z constituent consisted of nylon 6 having a relative viscosity of 2.45 which was determined under a condition in which 0.2 g. of the polymer was dissolved in 20 cc. of 98% sulfuric acid at a temperature of 25° C.

X, Y and Z constituents were spun through a spinneret indicated in FIGS. 22 and 23 in which the spinning orifice had a Y-shaped cross-section profile, indicated in FIG. 24, at a temperature of 285° C. The spun filament was solidified through a spinning chimney through which a cooling air of 25° C. temperature was flowed at a velocity of 35 m./min. The solidified filament was taken up at a velocity of 1,000 m./min. The filament was drawn at a draw ratio of 3.75 at a temperature from 120° C. to 140° C. so as to obtain a complex conjugate filament having a fineness of 4.17 denier. The content ratio of the X, Y and Z constituents in the obtained complex conjugate filament was approximately 39:33:28. The spinning and drawing processes were carried out at a favorable condition, and the complex conjugate filament had a cross-sectional profile indicated in FIG. 26 in which the boundary line between the X and Y constituent did not form a straight line, but formed a sharp curve so that the Y constitutent having a relatively higher viscosity protruded into the X constituent having a relatively lower viscosity.

The obtained complex conjugate filament was treated in a solution of calcium chloride in methanol at room temperature for removing the Z constituent, that is, nylon 6. The result was a fine composite filament consisting of X and Y constituents and having a cross-sectional profile indicated in FIG. 26, a fineness of approximately 1.0 denier and a tenacity of 3.6 g./denier.

The fine composite filament was treated in boiling water. Through this treatment, the fine composite filament was imparted with a number of crimps of 25 to 35 crimps/30 mm.

EXAMPLE 8

The complex conjugate filament preparing procedure of Example 7 was repeated except that the outlet of extrusion was half of that of Example 7 and the fineness of the resultant complex conjugate filament was approximately 2.1 denier.

The complex conjugate filament was treated in a solution of calcium chloride in methanol in order to dissolve off the nylon 6 Z constituent. The resulting composite filament had a fineness of 0.5 denier. The spinning process and drawing process were carried out without difficulty. The cross-section of the resultant composite filament was favorable. The composite filament was favorable. The composite filament could be imparted with a number of crimps of 25 to 35 crimps/25 mm. by treating with boiling water.

EXAMPLE 9

The complex conjugate filament preparing procedure of Example 1 was repeated using X, Y and Z constituents stated below. X constituent consisted of polyethylene terephthalate type copolyester containing, as an acid component, 10% by mol of isophthalic acid and having an intrinsic viscosity of 0.9, and 0.5% titanium dioxide powder based on the weight of the copolyester. The X constituent copolyester was prepared through a first polymerization under normal conditions, a chip-forming and a second solid-phase polymerization at a temperature of 210 to 230° C. in vacuum. The intrinsic viscosity was measured in O-chlorophenol at a temperature of 25° C.

The Y constituent consisted of polyethylene terephthalate having an intrinsic viscosity of 0.60 which was measured in O-chlorophenol at a temperature of 25° C., and 0.5% titanium dioxide powder based on the weight of the polyethylene terephthalate.

The Z constituent consisted of polyethylene terephthalate type copolyester containing, as a glycol component, 5% by weight of polyethylene glycol having a molecular weight of approximately 20,000, 5% sodium dodecylbenzenesulfonate based on the weight of the copolyester, and 0.2% Irganox 1010 (antioxidant, made by Geigy Co.) based on the weight of the copolyester.

The spinning was carried out at a temperature of 285° C. using the spinneret indicated in FIG. 1.

The spun filament passed through a spinning chimney through which cooling air having a temperature of 20° C. was flowed at a velocity of 40 m./min. in order to solidify it. The solidified filament was taken up at a velocity of 1,000 m./min. and then drawn at a draw ratio of 3.8 at a temperature of 90° C.

The fineness of the complex conjugate filament was 4.57 denier.

Figure 3:
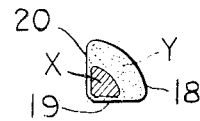

The complex conjugate filament was treated in an aqueous solution containing 4% by weight of sodium hydroxide at a temperature of 98° C. in order to remove the Z constituent. The resultant composite filament had a cross-sectional profile as indicated in FIG. 3, a fineness of 0.8 denier, a tenacity of 2.9 g./d. and a number of crimps of 4 crimps/30 mm. After this filament was stretched and then relaxed, the filament was imparted with a number of crimps of 10 to 15 crimps/30 mm.

EXAMPLE 10

A complex conjugate filament having a cross-sectional profile indicated in FIG. 28 was prepared from X, Y and Z constituents defined below. X constituent consisted of nylon 6 having a relative viscosity of 2.6 which was measured in a solution of 0.2 gram of the polymer in 20 cc. of 98% sulfuric acid at a temperature of 25° C. Y constituent consisted of a polymeric blend containing 65% by weight of nylon 6 and 35% by weight of block polyether polyamide.

The block polyether polyamide used had a relative viscosity of 2.4 which was measured in a solution of 0.29 gram of the polyamide in 20 cc. of m-cresol at a temperature of 25° C., and contained 0.2% Irganox 1010 based on the weight of the polyamide. The polyamide was prepared through the following steps.

Firstly, polyethylene glycol having a molecular weight of 4,000 was treated so that both terminal groups of the glycol were cyanoethylated, secondly, the cyanoethyl groups were converted to amino groups by hydrogenation, thirdly the resultant diamine compound was converted to a nylon salt by adding 1 mol of adipic acid to 1 mol of the diamine, fourthly, the nylon salt and ε-caprolactam were subjected to copolymerization at a temperature of 240° C. for 10 hours so that the resultant copolymer contained 45% of the polyethylene glycol component based on the total weight of the copolymer.

Z constituent consisted of a copolymer of 24% by weight of acrylonitrile and 76% by weight of styrene.

Figure 27:
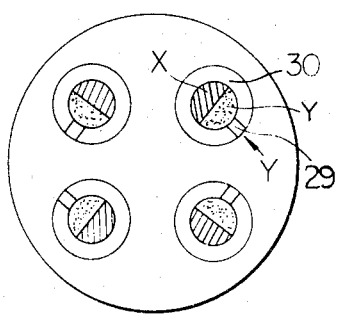

These X, Y and Z constituents were spun by using the spinneret indicated in FIGS. 7, 8 and 27 at a temperature of 280° C. at a content ratio of 30:30:40. The spinning process was carried out at a favorable condition, the spun filament was taken up at a velocity of 1,500 m./min. The filament was drawn at a draw ratio of 2.5 in a steam atmosphere at a temperature of 160° C. The resultant complex composite filament had a fineness of 3.5 denier.

The complex conjugate filament was treated in trichloroethylene for dissolving off the Z constituent. The resultant composite filament had a cross-sectional profile indicated in FIG. 29A or 29B, a fineness of 0.525 denier and a tenacity of 3.4 g./d. This composite filament had a water reversible crimping property, that is, degree of crimping on the composite filament increases at a wet condition but decreases at a dry condition.

EXAMPLE 11

The procedure of Example 10 was repeated except that the X constituent consisted of a nylon 6 type copolymer containing 25% isophthalic acid based on the weight of the copolymer as an acid component, Y constituent consisted of a normal nylon 6.

Figures 28, 29A:
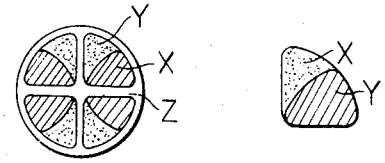
Figure 29B:
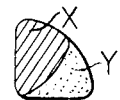

The spinning was carried out without difficulty, and the resultant complex conjugate filament had a cross-sectional profile as indicated in FIG. 28. The complex conjugate filament was treated in trichloroethylene, the resultant composite filament consisted of X and Y constituent and had a cross-sectional profile indicated in FIG. 29A or 29B, a fineness of 0.53 denier and a tenacity of 3.68 g./d. The composite filament was imparted with a number of crimps of 20 to 25 crimps/30 mm. by treating in boiling water.

EXAMPLE 12

The procedure of Example 3 was repeated except that the X constituent consisted of a copolymer of 85 parts by weight of nylon 6 and 15 parts by weight of nylon 66, Y constituent consisted of nylon 6, Z constituent consisted of a copolymer of 72 parts by weight of methyl methacrylate, 24 parts by weight of styrene and 4 parts by weight of acrylonitrile, the content ratio of the X, Y and Z constituents was approximately 32.5:32.5:35. Spinning was carried out at a temperature of 275° C., the spun filament was taken up at a velocity of 1,500 m./min. and drawn at a draw ratio of 2.5 at a temperature of 130° C. and the resultant complex conjugate filament had a fineness of 3 denier. The procedure was carried out at a favorable condition. The resultant complex conjugate filament having a cross-sectional profile indicated in FIG. 10 was treated in tetrachloroethylene for removing the Z constituent.

Figure 11:
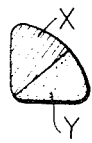

The resultant composite filament consisting of the X and Y constituents had a cross-sectional profile indicated in FIG. 11, a fineness of 0.49 denier and crimped by treating in boiling water or hot air.

EXAMPLE 13

Figure 32:
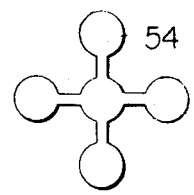
Figure 33:
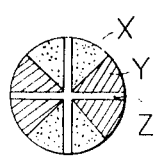

A complex conjugate filament having a cross-section profile indicated in FIG. 33 was prepared by using a spinneret indicated in FIGS. 30, 31 and 32 from X, Y and Z constituents stated hereinafter.

X constituent consisted of polyethylene terephthalate, Y constituent consisted of polytetramethylene terephthalate and Z constituent consisted of polyethylene terephthalate type copolyester containing 5% by mol of polyethylene glycol having a molecular weight of 20,000 as a glycol component, 5% sodium dodecylbenzene sulfonate and 0.25% Irganox 1010 based on the weight of the copolyester.

The spinning was carried out at a temperature of 280° C., the spun filament was passed through a spinning chimney through which cooling air having a temperature of 20° C. was flowed at a velocity of 35 m./min., taken up at a velocity of 1,000 m./min. and drawn at a draw ratio of 3.5 at a temperature of 140° C. The resultant complex conjugate filament had a content ratio of X, Y and Z constituents of 36:36:28 and a fineness of 5.8 denier.

Figures 34A, 34B:
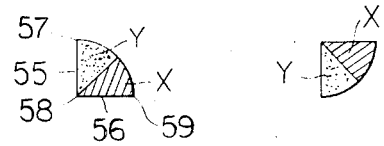

The complex conjugate filament was treated in an aqueous solution of 4% by weight of sodium hydroxide at a temperature of 97° C. for 30 minutes, rinsed with hot water and then dried. The result was a bundle of composite filaments consisting of X and Y constituents and each having a fineness of 1.0 denier and a tenacity of 3.8 g./d. The composite filaments in the resultant bundle had one of the cross-sectional profiles indicated in FIGS. 34A and 34B. That is, the resultant bundle was a mixture of composite filaments having the cross-sectional profile of FIG. 34A and those of FIG. 34B. The composite filament had a favorable silk-like sheen and crispness and was slightly crimped. The crimpings were increased by repeatedly stretching and relaxing the composite filament.

A yarn having a fineness of approximately 70 denier was prepared from 12 filaments of the complex conjugate filaments. The yarn was false-twisted under a condition in which the spindle run at a revolution of 180,000 r.p.m., and the yarn was twisted at a number of twist of 3,300 turns/m. and contacted with a heating plate for 0.8 second.

Two of the false-twisted yarns were twisted into a bulky textured yarn.

The resultant textured yarn was knitted into a plain knitting fabric by using a latch needle plain fabric circular knitting machine having a 17 guage. The knitted fabric was treated in an aqueous solution of 4% by weight of sodium hydroxide at a temperature of 98° C. for 40 minutes, rinsed with water and dyed with a blue disperse dye at a normal condition. The dyed fabric had a silk-like sheen, a high rigidity, a high resiliency, a silk-like hand feeling and a favorable bulkiness and useful for outer wear.

EXAMPLE 14

Figures 30, 31:
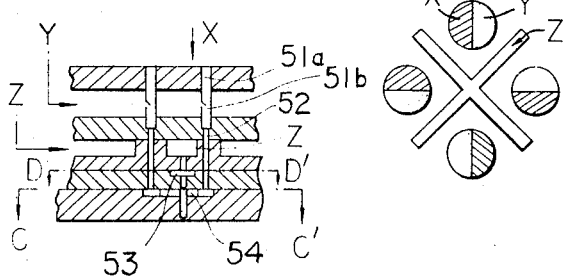
Figure 35:
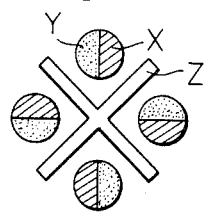

The procedure of Example 13 was repeated using a spinneret indicated in FIGS. 30 and 35.

Figure 36:
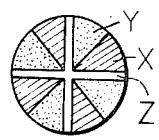

The resultant complex conjugate filament had a cross-sectional profile indicated in FIG. 36.

Figure 37:

A yarn was prepared from 10 complex conjugate filaments, and formed into a five-harness satin having a warp density of 96 yarns/cm. and a weft density of 42 yarns/cm.². The satin fabric was treated in an aqueous solution containing 4% by weight of sodium hydroxide at a temperature of 98° C. for 40 minutes in order to remove the Z constituent in the complex conjugate filaments, rinsed with water and dried. The treated fabric had a favorable silke-like hand feeling and sheen, and was composed of composite filaments having a cross-sectional profile indicated in FIG. 37.

EXAMPLE 15

Figure 38:
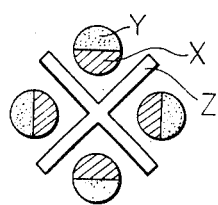
Figure 39:
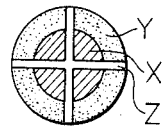
Figure 40:

The procedure of Example 13 was prepared at a content ratio of X, Y and Z constitutents of 25:50:25 using a spinneret indicated in FIGS. 30 and 38. The spinning was carried out without difficulty. The resultant complex conjugate filament had a cross-sectional profile indicated in FIG. 39 and a fineness of 5.8 denier. Through the treatment of the complex conjugate filament with the same alkali-solution as indicated in Example 13, a composite filament consisting of X and Y constituents and having a fineness of approximately 1.0 denier, a cross-sectional profile which had sharp edges as indicated in FIG. 40 was obtained. Also, the composite filament was slightly crimped.

EXAMPLE 16

Figure 41:
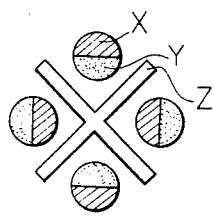

The procedure of Example 13 was repeated at a content ratio of X, Y and Z constituents of 37.5: 37.5:25 using a spinneret indicated in FIGS. 30 and 41.

Figure 42:
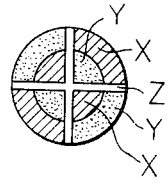

The resultant complex conjugate filament had a cross-sectional profile indicated in FIG. 42 and a fineness of 5.8 denier.

Figure 43A:
Figure 43B:

The spinning and drawings processes were carried out without difficulty, respectively. The resultant complex conjugate filaments were converted into a composite filament consisting of X and Y constituents and having a fineness of approximately 1 denier by treating in an alkali solution in the same manner as indicated in Example 14. The resultant composite filament bundle contained composite filaments having a the cross-sectional profile indicated in FIG. 43A and those of FIG. 43B.

EXAMPLE 17

Figure 44:
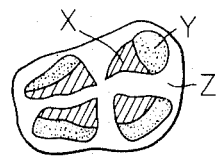

A complex conjugate filament having a cross-sectional profile indicated in FIG. 44 was prepared from respective solutions of the following X, Y and Z constituents in demethylsulfoxide at a content ratio of 25:25:50. X constituent consisted of a copolymer of 97.5% by mol of acrylonitrile, 2% by mol of methyl acrylate and 0.5% by mol of sodium allylsulfonate, Y constituent consisted of a copolymer of 92.7% by mol of acrylonitrile, 7% by mol of methyl acrylate and 0.5% by mol of sodium allylsulfonate. Z constituent consisted of cellulose acetate. The solution of the X, Y and Z constituents was extruded through the spinneret was indicated in FIG. 4 and coagulated by passing through an n-butanol bath. The coagulated filament was drawn at a draw ratio of 2.7 through a hot water bath containing a small amount of dimethyl sulfoxide. The resultant complex conjugate filament had a cross-sectional profile indicated in FIG. 44. In order to dissolve off the Z constituent, the complex conjugate filament was treated in acetone. The resultant composite filament consisting of the X and Y constituents had a tenacity of 1.052/d. and imparted with a number of crimps of 15 to 20 crimps/30 mm. by treating in boiling water.

EXAMPLE 18

The procedure of Example 17 was repeated except that the X constituent consisted of a copolymer of 97.7% by mol of acrylonitrile, 2% by mol of methyl acrylate and 0.2% by mol of sodium styrenesulfonate and the Y constituent consisted of a copolymer of 92.25% by mol of acrylonitrile, 7% by mol of methyl acrylate and 0.75% by mol of sodium allylsulfonate. After the Z constituent was dissolved off with acetone, the resultant composite filament consisting of X and Y constituents was treated in boiling water for crimping. This crimping was so-called "water-reversible" that is, this crimping was increased at a wet condition but decreased at dry condition.

EXAMPLE 19

The procedure of Example 1 was repeated except that the X constituent consisted of a polyethylene terephthalate type copolyester containing 5% by mol of polyethylene glycol having a molecular weight of 20,000; 5% sodium dodecylbenzenesulfonate and 0.2% Irganox 1010 based on the weight of the copolyester, the Y constituent consisted of polyethylene terephthalate having a high polymerization degree, the Z constituent consisted of the same as the X component, the content ratio of the X, Y and Z constituents was 15:55:30, the spun filament was taken up at a velocity of 1,000 m./min. and draw ratio was 3.7. The resultant complex conjugate filament had a cross-sectional profile indicated in FIG. 2 and a fineness of 3.0 denier.

When the complex conjugate filament was treated with an aqueous solution containing 4% by weight of sodium hydroxide at a temperature of 98° C., only the Z constituent was removed but the X constituent was not, because the X constituent was covered by the Y constituent. Thus, a composite filament consisting of X and Y constituents and having a fineness of 0.52 denier, was obtained. The composite filament was further drawn at a draw ratio of 1.03 and then released from the drawing. The further drawn composite filament was slightly crimped and had a tenacity of 2.3 g./d.

EXAMPLE 20

The procedure of Example 19 was repeated except that the X and Z constituents consisted of nylon 6, respectively. The resultant complex conjugate filament was treated in a solution of calcium chloride in methanol for removing only the Z constituent and rinsed with water. The resultant composite filament consisted of X and Y constituents and had a fineness of 0.51 denier and a "core-in-sheath" type cross-sectional profile in which the X constituent was eccentrically embedded in the Y constituent. Through treating in boiling water, the composite filament was slightly crimped. The treated composite filament was further drawn at a draw ratio of 1.02 at room temperature and released from the drawing. The crimping on the composite filament was increased.

EXAMPLE 21

The procedure of Example 10 was repeated except that the X constituent consisted of polypropylene having an intrinsic viscosity of 2.4 which was measured in tetrahydronaphthalene at a temperature of 130° C., Y constituent consisted of polypropylene having an intrinsic viscosity of 1.1, Z constituent consisted of nylon 6, the spinning temperature was 280° C., the content ratio of the X, Y and Z constituents was 35:35:30 and the spun filament was taken up at a velocity of 800 m./min. and then drawn at a draw ratio of 3.9 at a temperature of 100° C.

The resultant complex conjugate filament had a cross-sectional profile indicated in FIG. 28 and a fineness of 4.8 denier. The complex conjugate filament was treated in 15% hydrogen chloride in order to eliminate the Z constituent. The composite filament consisting of X and Y constituents and having a tenacity of 4.6 g./d. and a fineness of 0.84 denier was obtained. The composite filament further had a number of crimps of 20 to 30 crimps/30 mm.

EXAMPLE 22

The procedure of Example 21 was repeated except that the X constituent consisted of polyethylene, Y constituent consisted of polypropylene, Z constituent consisted of nylon 6, the spinneret indicated in FIG. 1 was used and the content ratio of the X, Y and Z constituents was 15:55:30.

The resultant complex conjugate filament had a cross-sectional profile indicated in FIG. 2 and a fineness of 4.8 denier. The complex conjugate filament was treated in 15% hydrogen chloride for eliminating the Z constituent. The resultant composite filament consisting of X and Y constituents had a fineness of 0.8 denier. Through treating in boiling water, the composite filament was imparted with a number of crimps of 15 to 20 crimps/30 mm. and had a tenacity of 4.3 g./d.

EXAMPLE 23

Figure 45:
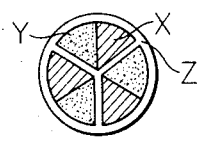
FIGS. 45, 47, 49, 51 and 53 show various cross-sectional profiles of the complex conjugate filaments of the present invention.

A complex conjugate filament having a cross-sectional profile indicated in FIG. 45 was prepared from the following X, Y and Z constituents, X constituent consisted of polyethylene terephthalate having an intrinsic viscosity of 0.9 which was measured in O-chlorophenol at a temperature of 25° C., Y constituent polyethylene terephthalate having an intrinsic viscosity of 0.65 and Z constituent a polyethylene terephthalate type partially block polymerized and residually blended copolyester containing 20% ethylene glycol-propylene glycol copolymer and 0.2% Irganox 1010 based on the weight of the copolyester. The three constituents were spun at a temperature of 280° C. through a spinneret as indicated in FIGS. 7 and 8 at a content ratio of X:Y:Z=40:32:28. The spun filament was taken up at a velocity of 1,000 m./min. and drawn at a draw ratio of 3.85. The resultant complex conjugate filament had a fineness of 0.5 denier and a cross-sectional profile indicated in FIG. 46. The complex conjugate filament was formed into a fabric and alkali-treated in the manner indicated in Example 12. After alkali-treatment, the resultant fabric was composed of a composite filament consisting of X and Y constituents and had a fineness of 0.84 denier and a tenacity of 3.7 g./d. Since the composite filament was slightly crimped, the fabric had a silk-like sheen, a favorable crispness, a high rigidity and high draping property. For comparison, the same procedure as the present example was repeated using only the X constituent. The comparison fabric had an unsatisfactory rigidity, crispness and resiliency. In view of the fabric's cross section, the average distance between the composite filaments in the fabric of the present example was larger than that of the comparison fabric.

EXAMPLE 24

The procedure of Example 23 was repeated except that the Y constituent consisted of a polymeric blend of polyethylene terephthalate and polytetramethylene terephthalate at a blending ratio of 50:50.

Figure 46:
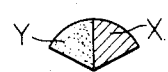
FIGS. 46, 48, 50, 52 and 54 show various cross-sectional profiles of the composite filaments of the present invention, each corresponds to the complex conjugate filaments of FIGS. 46, 47, 49, 51 and 53.

The resultant fabric was composed of composite filaments consisting of X and Y constituents and had a cross-sectional profile indicated in FIG. 46, a fineness of 0.84 and a tenacity of 3.3 g./d.

EXAMPLE 25

The procedure of Example 23 was repeated using the X constituent consisting of a polyethylene terephthalate type copolyester containing 3% by mol of sodium sulfoisophthalate as an acid component and having an intrinsic viscosity of 0.63, Y constituent consisting of a low viscous polyethylene terephthalate having an intrinsic viscosity of 0.52, and Z constituent consisting of a polyethylene terephthalate type copolyester as indicated in Example 19, 0.3% Irganox 1010 and 5% polyethylene glycol and 25% of the ethylene glycol-propylene glycol copolymer based on the weight of the copolyester. The resultant fabric composed of composite filaments consisting of X and Y constituents and having a cross-sectional profile indicated in FIG. 46, a fineness of 0.84 denier and a tenacity of 2.8 g./d. was dyed brilliant pink with a basic red dye and had an elegant silk-like hand feel.

EXAMPLE 26

The procedure of Example 24 was repeated except that the Z constituent consisted of polystyrene, the content ratio of the X, Y and Z constituents was 35:35:30, the complex conjugate filament obtained had a cross-sectional profile indicated in FIG. 47, drawing was carried out at a temperature of 90 to 120° C. and removing of the Z constituent was carried out in trichloroethylene.

Figure 48:

The resultant fabric was composed of composite filaments consisting of X and Y constituent and having a cross-sectional profile indicated in FIG. 48, a fineness of 0.379 denier and a tenacity of 3.2 g./d. The alkali-treatment for the fabric as indicated in Example 23 was effective for improving the hand feeling and sheen thereof.

The spinning process was carried out at a favorable condition without bending and dripping of the extruded melt. Basing upon this fact, it was found that a composite filament constituent positioned at a center of the complex conjugate filament and having an unsymmetrical location of X and Y constituents with respect to the center, does not essentially effect the spinning ability of the complex conjugate filament, and that the bending of the melt extruded through an orifice can be prevented by symmetrical location of X and Y constituents in the complex conjugate filament.

EXAMPLE 27

The spinning procedure of Example 5 was repeated except that the content ratio of the X, Y and Z constituents was 25:25:50, and the resultant complex conjugate filament had a cross-sectional profile indicated in FIG. 49 in which 16 composite filamentary constituents each consisting of X and Y constituents were embedded in the Z constituent. The spun complex conjugate filament was drawn at a draw ratio of 2.5 at a temperature of 90 to 105° C., mechanically crimped in a stuffing box and then cut in a length of 49 mm. The obtained staple had a fineness of 3.2 denier and produced a filamentary bundle containing 16 composite fibers each having a finess of 0.1 denier and a tenacity of 1.7 g./d. by treating in trichloroethylene in order to remove the Z constituent.

The fine composite fiber was imparted with a number of crimps of 50 or more crimps/30 mm. through treatment in hot air having a temperature of 120° C.

Figure 50:
Figure 51:
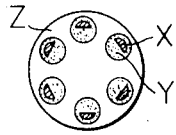
Figure 52:

The crimped composite fiber was subjected to a carding machine, random webber machine and then, a needle punching machine having a needle density of 3,300 needles/cm.$^2$ in order to prepare a felt sheet having a weight of 600 g./m.$^2$. The felt sheet had an apparent density of 0.16 g./cm.$^3$. The felt sheet was treated in tetrachloromethane in order to dissolve off the Z constituent and squeezed with a pair of rollers and the residual solvent was removed by way of a centrifuge. A felt sheet composed of bundles of fine composite fibers each consisting of the X and Y constituents and having a cross-sectional profile indicated in FIG. 50 was obtained. The felt sheet was further treated in boiling water. through the boiling water treatment, the fine composite fibers in the felt sheet were crimped and became entangled with each other. The resultant felt sheet had a higher resiliency, a more favorable hand feeling, a more bulky feeling and higher rigidity than that of the conventional felt sheet prepared from the conventional fibers consisting of the X constituent alone or X and Y constituent. The crimped fine fibers were apparently observed on the surface of the resultant felt sheet.

For comparison, the preparation of fine fibers consisting of X and Y constituents and having a fineness of 0.1 denier was attempted using the conventional "side-by side" type spinneret. The spinning failed due to dripping of the extruded melt at the orifice. Further, for comparison, the spinning of the fine fibers stated above was attempted using a spinneret having an inclined orifice so as to prevent the extruded melt from bending toward a high viscosity constituent side. However, the spinning could not be carried out due to dripping of the extruded melt.

What we claim is:

1. A synthetic complex conjugate filament useful for manufacturing a composite filament having a high crimp potential comprising: a plurality of eccentric composite filamentary segments extending along the filament length spaced apart from each other, each of said segments being composed of two filamentary constituents consisting of synthetic polymers different from each other in shrinkage and eccentrically incorporated into a "core-in-sheath" type composite filament form, and a synthetic polymeric filamentary uniting constituent uniting said eccentric composite filamentary segments into a filament body and filling up spaces between said eccentric composite filamentary segments.

2. A complex conjugated filament as set forth in claim 1, wherein said sheath constituents in said eccentric composite filamentary segments comprise a material having a removal velocity lower than that of said uniting constituent with respect to solvents effective for removing said uniting constituent.

3. A complex conjugate filament as set forth in claim 2, wherein said core constituents in said eccentric composite filamentary segments consist essentially of the same polymeric material as that of said uniting constituent.

4. A complex conjugate filament as set forth in claim 1, wherein said eccentric composite filamentary segments have a denier not exceeding 2.0.

5. A complex conjugate filament as set forth in claim 1, wherein said eccentric composite filamentary segments have an irregular cross-section and a denier not exceeding 1.2.

6. A complex conjugate filament as set forth in claim 1, wherein said eccentric composite filamentary segments have a circular cross-section and denier not exceeding 0.8.

7. A complex conjugate filament as set forth in claim 5, wherein at least one segment has at least one plane longitudinal surface.

8. A complex conjugate filament set forth in claim 5, wherein the cross-sectional profile is trilobal.

9. A complex conjugate filament as set forth in claim 1, wherein at least one of said filamentary constituents in said eccentric composite filamentary segment has a thermal shrinkage different from that of the remainder.

10. A complex conjugate filament as set forth in claim 1, wherein at least one of said filamentary constituents in said eccentric composite filamentary segment has a solvent shrinkage different from that of the remainder.

11. A complex conjugate filament as set forth in claim 1, wherein at least one of said filamentary constituents in said eccentric composite filamentary segment consists of at least one member selected from the group consisting of polyesters, polyamides, polyolefins and acrylic polymers 12. A complex conjugate filament as set forth in claim 11, wherein all of said filamentary constituents comprise polyesters different from each other in intrinsic viscosity or composition.

13. A complex conjugate filament as set forth in claim 1, wherein said uniting constituent consists essentially of a styrene-containing polymer.

14. A complex conjugate filament as set forth in claim 13, wherein said styrene-containing polymer is soluble in a member selected from the group consisting of trichlorethylene, tetrachlorethylene, benzene, toluene, xylene, tetrachloromethane dimethyl acetamide, dimethyl sulfoxide and dimethyl formamide.

15. A complex conjugate filament as set forth in claim 1, wherein said uniting constituent consists essentially of a polyester.

16. A complex conjugate filament as set forth in claim 1, wherein said uniting constituent consists essentially of a polyamide.

References Cited

UNITED STATES PATENTS

| | | | |
|---|---|---|---|
| 3,402,097 | 9/1968 | Knudsen et al. | 161—177 |
| 2,932,079 | 4/1960 | Dietzsch et al. | 161—175 |
| 3,341,891 | 9/1967 | Shimizu et al. | 161—177 X |
| 3,117,362 | 1/1964 | Breen | 161—177 |
| 3,562,374 | 2/1971 | Okamoto et al. | |
| 3,531,368 | 9/1970 | Okamoto et al. | 161—175 |
| 3,075,241 | 1/1963 | Dietzsch et al. | |
| 3,197,812 | 8/1965 | Dietzsch et al. | |
| 3,568,249 | 3/1971 | Matsui | 18—8 |
| 3,642,565 | 2/1972 | Ogata et al. | 161—173 |

ROBERT F. BURNET, Primary Examiner

L. T. KENDELL, Assistant Examiner

U.S. Cl. X.R.

161—175, 176, 177; 264—Dig. 26, 171